United States Patent [19]

Magyar

[11] 4,206,888
[45] Jun. 10, 1980

[54] TENSION RELIEVER FOR SEAT BELT RETRACTOR

[75] Inventor: Joseph J. Magyar, Rochester, Mich.

[73] Assignee: General Motors Corporation, Detroit, Mich.

[21] Appl. No.: 965,311

[22] Filed: Dec. 1, 1978

[51] Int. Cl.² .................. A62B 35/02; B65H 75/48
[52] U.S. Cl. ............................................. 242/107.7
[58] Field of Search ............ 242/107.7, 107.6, 107.12, 242/107.3; 297/388; 280/803, 806, 807, 808

[56] References Cited

U.S. PATENT DOCUMENTS

| | | | |
|---|---|---|---|
| 2,758,333 | 8/1956 | Monjar et al. | 242/107.7 X |
| 3,058,687 | 10/1962 | Bentley | 242/107.4 B |
| 3,432,623 | 3/1969 | Blanch et al. | 242/107.7 X |
| 3,869,098 | 3/1975 | Sprecher | 242/107.4 A |
| 3,917,189 | 11/1975 | Bryll | 242/107.4 B |
| 3,941,330 | 3/1976 | Ulrich | 242/107.4 B |

*Primary Examiner*—John M. Jillions
*Attorney, Agent, or Firm*—Charles E. Leahy

[57] ABSTRACT

According to the invention a spring wound seat belt reel has a plurality of pawls which are movable between radially extended and radially retracted positions. A clutch acts between the reel and the pawls to retain the pawls at their respectively attained extended or retracted positions. The pawls move to their extended positions when the clutch is overcome by centrifugal force acting upon the pawls during winding rotation of the reel at a velocity normally induced by the winding spring. The clutch retains the pawls in their retracted positions when the occupant feeds the belt slowly into the retractor to retard the reel rotation to a velocity less than the velocity normally induced by the winding spring. A latch bar is pivotally mounted on the housing and has a latch face adapted for engagement by one of the extended pawls to prevent further belt winding and thereby relieve the taut condition of the belt about the occupant. The latch bar also has a reset face which successively engages the extended pawls during subsequent belt unwinding to forcibly return the extended pawls to their retracted positions. The latch bar may be pivotally moved away from engagement with the extended pawls to permit belt winding reel rotation irrespective of return of the pawls to the retracted position.

2 Claims, 3 Drawing Figures

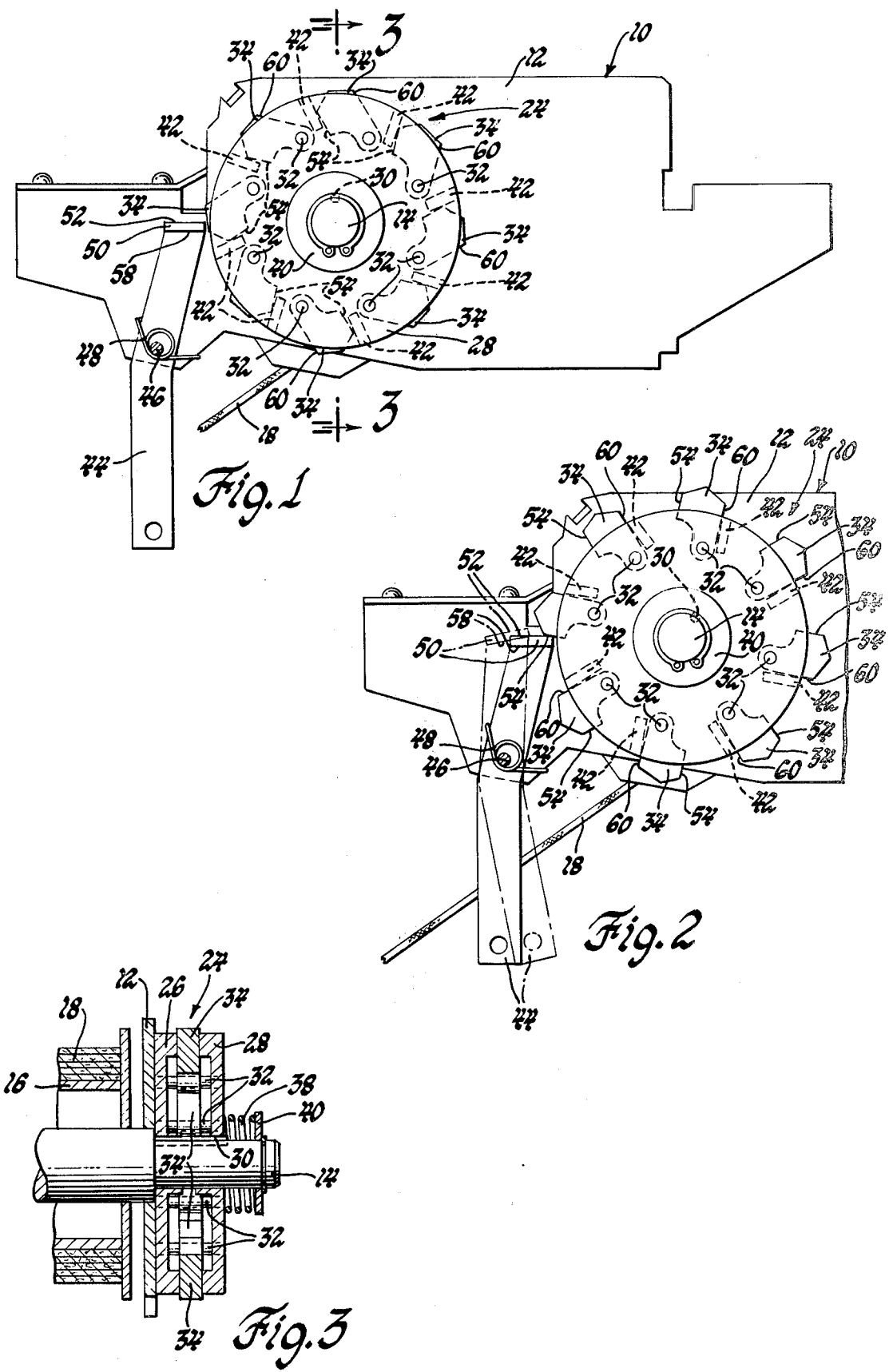

TENSION RELIEVER FOR SEAT BELT RETRACTOR

The invention relates to a tension relieving device for a seat belt retractor and more particularly to a tension reliever which is actuated in response to rapid retraction of the seat belt.

It is known that the comfort of a restrained seat occupant may be enhanced by providing mechanism associated with the seat belt retractor for locking the retractor reel against belt winding rotation so that the belt may assume a somewhat slackened condition about the occupant. It is known to provide such a restraint belt retractor having a winding prevention mechanism which selectively relieves the tension on the belt in response to a predetermined sequence of belt movement by the restrained occupant. For example, U.S. Pat. No. 3,869,098 by Raymond G. Sprecher issued Mar. 4, 1975 discloses a pair of discs frictionally clutched to the reel which cooperate to actuate a pawl for locking the reel against belt winding rotation in response to a slight extension of a previously retracted belt. U.S. Pat. No. 3,917,189 by Medard Z. Bryll issued Nov. 4, 1975 provides a tension reliever which is actuated when the occupant exerts a sharp snap or acceleration of the belt in the unwinding direction.

The present invention provides a new and improved seat belt retractor having a tension reliever which is actuated if the retractor winding spring winds the belt at a high velocity but remains unactuated if the seat occupant feeds the belt to the retractor at a rate which does not allow the reel to reach the velocity normally obtained by the effort of the winding spring.

SUMMARY OF THE INVENTION

According to the invention a seat belt retractor reel has a plurality of pawls which are movable between radially extended and radially retracted positions. A clutch acts between the reel and the pawls to retain the pawls at their respectively attained extended or retracted positions. The mass of the pawls, the strength of the clutch and the winding effort of the retractor winding spring are interrelated so that the clutch is overcome by centrifugal force upon belt winding rotation of the reel at a velocity normally induced by the winding spring to move the retracted pawls to the extended position. The clutch retains the pawls in their retracted positions when the occupant feeds the belt slowly into the retractor to retard the velocity of the belt winding reel rotation to a velocity less than the velocity normally induced by the winding spring. A latch bar is mounted on the housing and has a latch face adapted for engagement by one of the extended pawls to prevent further belt winding and thereby relieve the taut condition of the belt about the occupant. The latch bar also has a reset face which successively engages the extended pawls during a subsequent unwinding to forcibly return the pawls to their retracted positions. The latch bar is preferably pivotally mounted on the housing for movement away from engagement with the extended pawls to permit belt winding reel rotation irrespective of a belt unwinding rotation effective to return the pawls to the retracted position.

Accordingly, the object, feature and advantage of the invention resides in the provision of a tension relieving mechanism for a seat belt retractor wherein pawls are movable outwardly to engage a latch bar in response to the normal rate of reel rotation induced by the retractor windup spring but remain in a retracted position permitting free belt windup when the operator feeds the belt into the retractor at a rate which prevents the windup spring from reaching the higher velocity necessary to move the pawls to the extended position.

DESCRIPTION OF THE DRAWINGS

The object, feature and advantage of the invention will become apparent upon consideration of the specification and the appended drawings in which:

FIG. 1 is a side elevation view of a seat belt retractor showing the tension relieving mechanism in the unactuated condition permitting free belt winding rotation of the reel;

FIG. 2 is a view similar to FIG. 1 but showing the tension relieving mechanism actuated to block belt winding rotation of the retractor reel; and FIG. 3 is a sectional view taken in the direction of arrows 3—3 of FIG. 1.

DESCRIPTION OF THE PREFERRED EMBODIMENT

Referring to FIGS. 1 and 3, it is seen that a seat belt retractor generally indicated at 10 includes a frame 12 which rotatably mounts a reel shaft 14 upon which a reel 16 is attached. Rotation of the reel shaft 14 and the reel 16 by a winding spring, not shown, winds the belt 18 on the retractor and pulls the belt taut against a seated occupant.

A conventional vehicle sensitive locking mechanism, not shown, includes a pendulum which moves a lock bar into engagement with the reel. Thus the occupant is normally permitted to unwind the belt from the reel but the reel is locked against unwinding rotation in response to occurrence of rapid vehicle deceleration.

A tension relieving mechanism generally indicated at 24 is associated with the reel shaft 14. As best seen in FIG. 3, the tension relieving mechanism 24 includes a pair of clutch discs 26 and 28 attached to the reel shaft 14 by a key 30 so that the discs 26 and 28 rotate in unison with the shaft 14 but the disc 28 is permitted to move axially relative the disc 26. A plurality of pivot pins 32 extend between the clutch discs 26 and 28 and pivotally mount a plurality of centrifugal pawls 34 for pivotal movement between a normal retracted position of FIG. 1 and an extended position of FIG. 2. A compression spring 38 encircles the end of shaft 14 and acts between a spring seat 40 and the clutch disc 28 to urge the clutch disc 28 into frictional engagement with the pawls 34 and in turn urge the pawls 34 into frictional engagement with the clutch disc 26. The clutch discs 26 and 28 cooperate to restrain the pawls in either the retracted or the extended position. As best seen by comparing FIGS. 1 and 2, a plurality of stops 42 are provided on one of the clutch discs 26 or 28 and are interposed between the pawls 34 to define a limit of inward retraction of the pawls as shown in FIG. 1 and a limit of outward extension of the pawls as shown in FIG. 2.

A latch bar 44 is pivotally mounted on the retractor frame 12 by a pivot shaft 46. A spring 48 acts between the retractor frame 12 and latch bar 44 to urge the latch bar 44 to a normal position of FIG. 1 wherein the end 50 of the latch bar is poised radially outwardly of the retracted pawls 34. As best seen in FIG. 2, the latch bar 44 has a latch face 52 which faces toward and is engageable with a corresponding latch face 54 provided on each of the pawls 34. As seen in FIG. 2, engagement of the pawl latch face 54 of one of the pawls 34 with the latch bar latch face 52 occurs when the pawls 34 are in the extended position and is effective to lock the reel against belt winding rotation to thereby relieve the taut condition of the belt about the occupant. The latch bar 44 also has a reset face 58 which faces toward and is engageable with a mating corresponding reset face 60 provided on each of the pawls. As the belt is unwound from the position of FIG. 2, the pawls 34 are successively carried toward the latch bar reset face 58 and are accordingly forcibly returned to their respective retracted positions.

OPERATION

In operation, the pawls 34 are thrown outwardly from their FIG. 1 radially retracted position to the FIG. 2 radially extended position by centrifugal forces during winding rotation of the reel. The response of the pawls 34 to winding rotation of the disc is dependent upon multiple factors including the winding effort of the retractor winding spring, the mass of the pawls 34 and the clutching effort provided by the spring 38 and the discs 26 and 28. These various factors are adjusted to provide a tension relieving mechanism wherein the pawls 34 will fly outwardly to the position of FIG. 2 during winding belt rotation of the reel at a velocity induced by the winding spring. Accordingly, if the occupant allows free unretarded movement of the belt toward the retractor, the winding spring will rotate the belt at a velocity which causes extension of the pawls 34 to their radially extended position of FIG. 2 wherein the latch face 54 of one of the pawls 34 engages the latch face 52 of the latch bar 44 to prevent further winding rotation of the reel and hold the belt at a slackened length. A subsequent unwinding of the belt 18 by the occupant will successively carry the reset face 60 of the pawls 34 into engagement with the reset face 58 of the latch bar 44 to forcibly return the pawls 34 to their retracted positions of FIG. 1. In this regard it will be understood that if the reel is unwound through 180° of rotation from the position of FIG. 2, about ½ of the pawls will be reset. If the occupant then allows belt rewinding, the rewinding will be terminated when the first of the still extended pawls is returned into engagement with the latch lever latch face 52. Thus, the tension reliever will remember the slackened length of the belt during any unwinding rotation less than one complete revolution but will be completely cancelled out if the winding revolution of the reel exceeds one revolution.

If the occupant does not wish to set the tension reliever, the belt is slipped through the fingers to permit winding rotation of the reel at a velocity lesser than would normally be induced by the effort of the winding spring. Accordingly, the velocity of the reel does not attain a level which imposes centrifugal forces upon the pawls 34 sufficient to overcome the restraining effect of the clutch discs 26 and 28.

If the occupant wishes to disengage the tension reliever without unwinding the belt, the latch bar 44 may be pivoted to its phantom-line indicated position of FIG. 2 wherein the latch bar latch face 52 is withdrawn from engagement with the pawl latch face 54. Movement of the latch bar 44 to the disengaged position can be conveniently provided by a door operated plunger as disclosed in U.S. Pat. No. 3,973,786 by Lloyd W. Rogers issued Aug. 10, 1976.

Thus, it is seen that the invention provides a new and improved tension relieving seat belt retractor which becomes actuated if the retractor winding spring winds the belt at a high velocity but remains unactuated if the seat occupant feeds the belt to the retractor at a rate which does not allow the reel to reach the velocity normally obtained by the effort of the winding spring.

The embodiments of the invention in which an exclusive property or privilege is claimed are defined as follows:

1. In an automotive vehicle having a restraint belt for restraining an occupant in a vehicle seat, a housing, a belt reel rotatably mounted on the housing, a winding spring urging belt winding rotation of the reel to pull the belt taut against the occupant, and a locking mechanism effective to prevent belt unwinding only in response to a sensed emergency condition so that the occupant may normally lean forwardly in the seat, the improvement comprising:

reel latch means on the housing;

pawls means mounted on the reel for rotation therewith and movable between an extended position engageable with the reel latch means to prevent belt winding reel rotation by the winding spring and thereby relieve the taut condition of the belt against the occupant and a retracted position free of the reel latch means permitting belt winding reel rotation, said pawl means being centrifugally moved to the extended position upon belt winding rotation of the reel at a velocity induced by the winding spring to thereby engage with the latch means and said pawl means remaining at the retracted position free of the latch means when the occupant retards the velocity of belt winding reel rotation to a velocity less than induced by retarded winding spring effort;

a reset abutment on the housing engageable by the extended pawl means to return the extended pawl means to the retracted position upon subsequent unwinding rotation of the reel;

and yieldable means mounting the reel latch means on the housing and adapted to permit selective disengagement of the reel latch means from the extended pawl means irrespective of belt unwinding rotation.

2. In an automotive vehicle having a restraint belt for restraining an occupant in the vehicle seat, a housing, a belt reel rotatably mounted on the housing, a winding spring urging rotation of the reel to wind the belt and pull the belt taut against the occupant, and a locking mechanism effective to prevent belt unwinding only in response to a sensed acceleration condition so that the occupant may normally lean forwardly in the seat, the improvement comprising:

a plurality of pawls mounted on the reel for movement between radially extended and radially retracted positions;

clutch means acting between the reel and the pawls to retain each pawl at its respectively attained extended or retracted position, said clutch means being overcome by centrifugal force upon belt winding rotation of the reel at a velocity induced by the winding spring to thereby move the retracted pawl means to the extended position, and said clutch means acting to retain the pawls in the retracted position when the occupant retards the velocity of belt winding reel rotation to a velocity less than the velocity induced by unretarded winding spring effort;

a latch bar mounted on the housing and having a latch face adapted for engagement by one of the pawls upon belt winding rotation subsequent to movement of the pawls to the extended position to prevent belt winding reel rotation by the winding spring and thereby relieve the taut condition of the belt about the occupant, said latch bar also having a reset face adapted for engagement by the adjacent pawl to forcibly return the extended pawls to the retracted position upon successive engagement therewith during unwinding reel rotation to permit subsequent belt winding reel rotation;

and means for disengaging the latch bar from engagement with the extended pawl to permit belt winding reel rotation irrespective of a belt unwinding rotation effective to return the pawls to the retracted position.

* * * * *